US011822065B2

(12) United States Patent
Irzyk et al.

(10) Patent No.: US 11,822,065 B2
(45) Date of Patent: Nov. 21, 2023

(54) LIGHT-GUIDE FOR GESTURE-DETECTING INTERFACE MODULE

(71) Applicant: VALEO COMFORT AND DRIVING ASSISTANCE, Créteil (FR)

(72) Inventors: Michael Irzyk, Créteil (FR); Thibault Cabana, Créteil (FR); Marc Menet, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 603 days.

(21) Appl. No.: 17/050,656

(22) PCT Filed: Apr. 24, 2019

(86) PCT No.: PCT/EP2019/060438
§ 371 (c)(1),
(2) Date: Oct. 26, 2020

(87) PCT Pub. No.: WO2019/206946
PCT Pub. Date: Oct. 31, 2019

(65) Prior Publication Data
US 2021/0239951 A1   Aug. 5, 2021

(30) Foreign Application Priority Data
Apr. 24, 2018   (FR) ..................... 1853590

(51) Int. Cl.
*G02B 19/00* (2006.01)
*B60K 35/00* (2006.01)
(Continued)

(52) U.S. Cl.
CPC .......... *G02B 19/0028* (2013.01); *B60K 35/00* (2013.01); *G02B 6/003* (2013.01);
(Continued)

(58) Field of Classification Search
CPC .. G02B 19/0028; G02B 6/0025; G02B 6/003; G02B 6/0053; G02B 19/0061;
(Continued)

(56) References Cited

U.S. PATENT DOCUMENTS

| 5,303,322 A | * | 4/1994 | Winston | ................ | G02B 6/005 |
| | | | | | 385/129 |
| 7,969,531 B1 | * | 6/2011 | Li | ....................... | G02B 6/0056 |
| | | | | | 349/200 |

(Continued)

OTHER PUBLICATIONS

International Search Report and Written Opinion in corresponding International Application No. PCT/EP2019/060438, dated May 31, 2019 (17 pages).

*Primary Examiner* — Kiho Kim
(74) *Attorney, Agent, or Firm* — Osha Bergman Watanabe & Burton LLP

(57) ABSTRACT

One subject of the invention is a light guide (13), for an interface module, in particular for a vehicle passenger compartment, for emitting or receiving a light beam in a cone that is elongate in a transverse direction and that is centred on a plane that is inclined by an angle θ with respect to an optical axis (z) of the light guide, taking the form of a prism made of transparent material of index $n_{GL}$, characterised in that it comprises: •an interior dioptric interface intended to face a printed circuit board (7) bearing a light source (5) or a light detector, forming a convergent lens the focal point of which is located at an expected position of the light source (5) or of the light detector, •a first planar face (15) that is oriented parallel to the optical axis (z) of the light guide, and •a second planar face (17) that is inclined with respect to the first face (15) by an angle α respecting $\cos(\alpha+\theta)=(1-\varepsilon) n_{GL}*\cos 3\alpha$, with ε a number comprised between −0.1 and 0.1.

11 Claims, 4 Drawing Sheets

Figure 1:
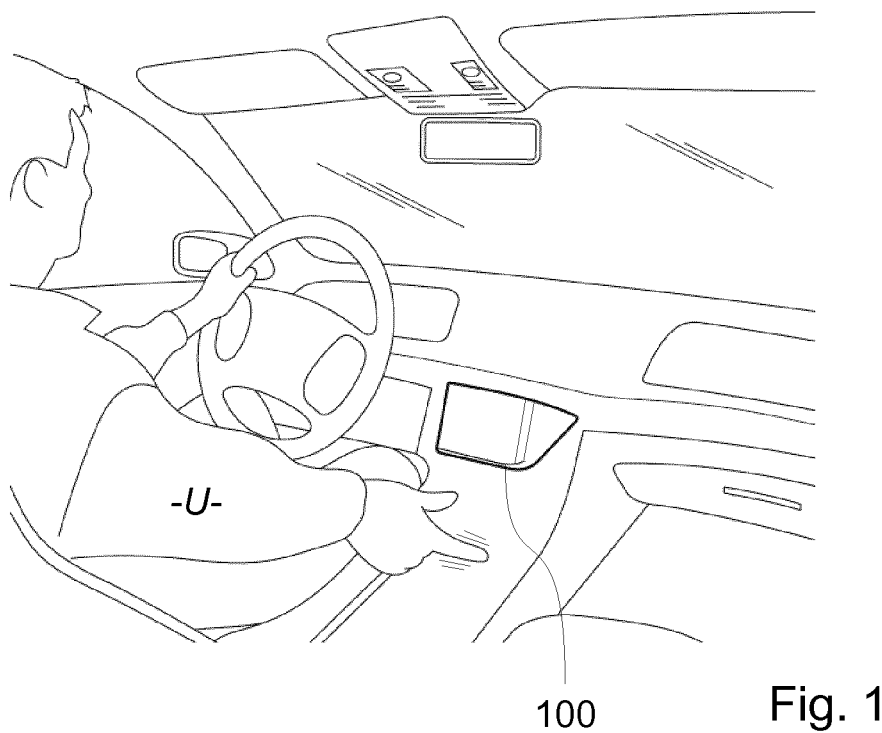

(51) Int. Cl.
*F21V 8/00* (2006.01)
*G06F 3/01* (2006.01)

(52) U.S. Cl.
CPC ......... *G02B 6/0025* (2013.01); *G02B 6/0053* (2013.01); *G02B 19/0061* (2013.01); *G02B 19/0076* (2013.01); *G06F 3/017* (2013.01); *B60K 2370/146* (2019.05); *B60K 2370/20* (2019.05)

(58) Field of Classification Search
CPC ............ G02B 19/0076; G02B 19/0066; G02B 17/086; B60K 35/00; B60K 2370/146; B60K 2370/20; G06F 3/017
See application file for complete search history.

(56) References Cited

U.S. PATENT DOCUMENTS

| | | | | |
|---|---|---|---|---|
| 9,664,909 | B1* | 5/2017 | Whiteside | G02B 17/086 |
| 2013/0314303 | A1* | 11/2013 | Osterhout | G02B 27/017 |
| | | | | 345/8 |
| 2014/0041205 | A1* | 2/2014 | Robinson | G02B 6/0026 |
| | | | | 29/592.1 |
| 2015/0235447 | A1* | 8/2015 | Abovitz | G16H 40/20 |
| | | | | 345/633 |
| 2019/0025590 | A1* | 1/2019 | Haddick | G02B 5/3025 |
| 2021/0239951 | A1* | 8/2021 | Irzyk | G02B 19/0028 |

* cited by examiner

LIGHT-GUIDE FOR GESTURE-DETECTING INTERFACE MODULE

The present invention relates to a gesture or proximity detection interface module, in particular for use in a motor vehicle passenger compartment.

Gesture or proximity detectors detect the presence of part of the body, generally the hand, the fingers and/or part of the arm of a user in a detection space. The presence, the position and/or the movements of said part of the body of the user are then taken into account in order to control functions that are controlled by the interface module.

The entry of the hand of a user into the detection space may for example be used to switch the interface module from a standby mode to an active mode. If said interface module comprises for example a touchscreen or display screen, the screen may be initially deactivated or backlit to a lesser extent in standby mode, and the touch surface may be activated only when the interface module leaves standby mode, that is to say when a user brings his hand close in order to interact with the interface module.

When the detection of the position of the hand or arm of the user in the detection space is taken into account, the icons in the portion of the screen close to the detected position may be enlarged, in particular in proportion to the proximity of the hand to the screen.

The detected variation in the position of the hand or the arm, that is to say the movements of the hand or the arm, may be used directly to modify the operation of modules of the vehicle, such as the air-conditioning system, a media playback system, interior lighting of the vehicle, or a menu displayed on the touchscreen. For example, a swipe of the hand from bottom to top or from top to bottom may be used to increase or decrease the volume of the media playback system, while a swipe from left to right or from right to left may be used to skip to the next or previous radio station or track.

In order to position and track the hand of the user with greater accuracy, a high number of light beams are required. These beams are produced for example by way of light guides located at the edge of the screen and using the light from one or more light-emitting diodes. The light guides are designed such that they emit at least a portion of the collected light in the form of a conical beam, thin in one transverse direction and elongated in the other transverse direction, thereby making it possible to approach a plane of the detection space.

The detection space is then split into grids by way of such beam planes.

By determining which beam is passed through by the hand at which time, the approximate position of the hand may then be determined and tracked over time in order to identify and analyze specific gestures by the user.

Each of the "planar" beams is generated by way of a light guide that is inclined depending on the desired incline of the beam.

The maximum angle of incline achievable using waveguides is generally less than 10°, or even sometimes 15°. Therefore, in order to cover a large detection space (for example in front of a large screen), a subset of the light guides, with the diodes and associated electronics, is inclined with respect to the plane that contains the screen.

These separate lighting modules positioned in inclined planes then require a second printed circuit board and fasteners to keep them in an inclined position. The increase in the number of lighting modules therefore makes the interface module bulkier and potentially more expensive.

In order to at least partially solve the abovementioned problem, one subject of the invention is a light guide for an interface module, in particular for a vehicle passenger compartment, for emitting or receiving a light beam in a cone elongated in a transverse direction and centered about a plane inclined by an angle $\theta$ with respect to an optical axis of the light guide, produced in the form of a prism of transparent material of index $n_{GL}$, characterized in that it comprises:
  an inner diopter intended to face a printed circuit board bearing a light source or a light detector, forming a converging lens whose focal point is located at an expected position of the source or of the light detector,
  a first planar face oriented parallel to the optical axis of the light guide,
  a second planar face inclined with respect to the first planar face by an angle $\alpha$, satisfying $\cos(\alpha+\theta)=(1+\varepsilon) n_{GL}*\cos 3\alpha$, where $\varepsilon$ is a number between −0.1 and 0.1.

Such a light guide makes it possible to emit a light beam elongated in a transverse direction (parallel to the edge of the screen along which the detector is positioned) with a relatively large incline. This therefore makes it possible to design more compact interfaces.

The light guide may then have one or more of the following features, taken alone or in combination.

The inner diopter is an input diopter located, in the mounted state of the light guide, in front of a light source.

The inner diopter is an output diopter located, in the mounted state of the light guide, in front of a light detector.

The inner diopter is produced in the form of a Fresnel lens, and the light source or the light detector in front of the inner diopter is located at the focal point of the Fresnel lens. The guide that is thus obtained is more axially compact.

The angle $\theta$ is greater than 25°, in particular between 30° and 45°.

It comprises a plurality of inner diopters, aligned along a longitudinal axis of the light guide, each intended to be positioned at a light source or a light detector. It may then be adapted to large screens.

It comprises at least one transverse portion, the second planar face of which forms an angle $\alpha_1$ different from the angle $\alpha$ with the first planar face, so as to emit transverse beam portions at an angle $\theta_1$ linked to the angle $\alpha_1$ by the relationship $\cos(\alpha_1+\theta_1)=(1+\varepsilon) n_{GL}*\cos 3\alpha_1$, where c is a number between −0.1 and 0.1.

Another subject of the invention is the interface module, in particular for a vehicle passenger compartment, for detecting the presence of or gestures by part of the body of a user, comprising:
  at least one light source intended to illuminate at least part of a detection space of the interface module,
  at least one light detector, intended to detect light from the source returned by part of the body of a user located in the detection space,
  characterized in that it furthermore comprises a light guide as claimed in one of the preceding claims, configured so as to emit or collect light in a beam centered about a plane inclined with respect to the optical axis by an angle $\theta$ greater than 25°, in particular between 30° and 45°.

Such a module may furthermore comprise:
  respectively, at least two light sources or at least two light detectors, arranged on a printed circuit board,
  respectively, at least one detector or at least one light source, covering the entire detection space, a first light guide as mentioned above, positioned in front of at least one of the light sources or one of the light detectors on the printed circuit board, a second light guide, comprising a body made of transparent or translucent material guiding light by reflection from its guide walls, comprising:

an inner diopter of the second light guide at one of the ends of the transparent or translucent body, intended to be directed to a light detector or one or more light sources, an outer diopter, located at an end opposite the inner diopter of the body made of transparent material, characterized in that the outer diopter of the second light guide comprises two distinct transverse surfaces, with normals pointing in different directions in order to combine light between two separate portions of the detection space, on the one hand, and the inner diopter of the second light guide, on the other hand.

The two separate portions of the detection space may then be two transversely elongated cones, located about two planes that are inclined with respect to a height of the first light guide by angles less than the angle θ.

The sources and/or the light detectors associated with the first and the second light guide may then be positioned on one and the same printed circuit board.

Such an interface module makes it possible to generate at least three beams of different inclines above the screen by way of a compact and potentially less expensive gesture sensor.

Figure 2:
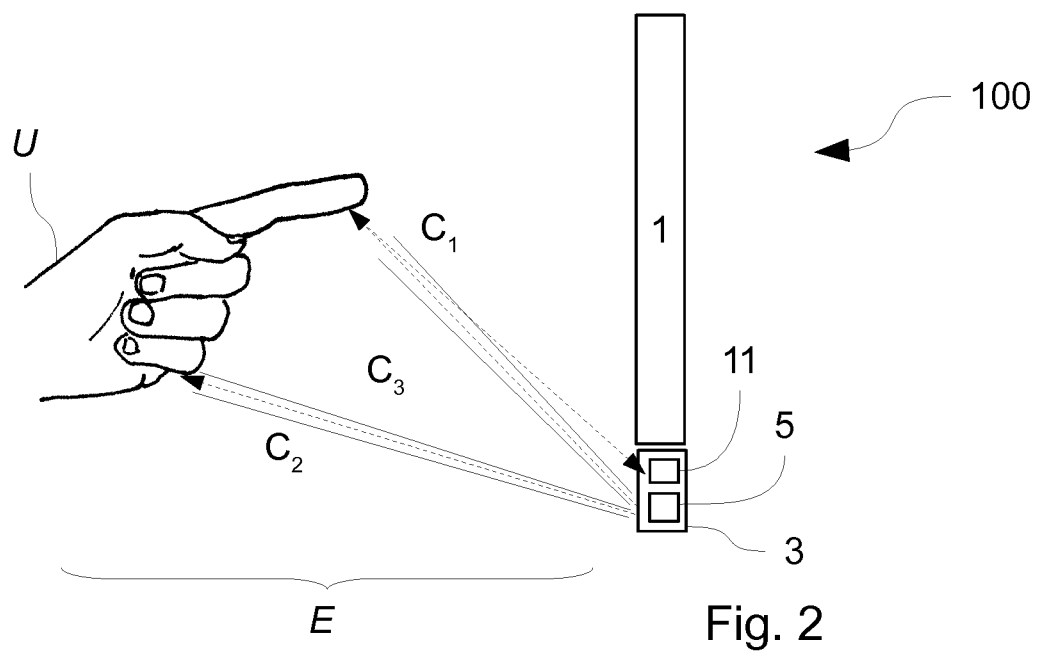
Figure 3:
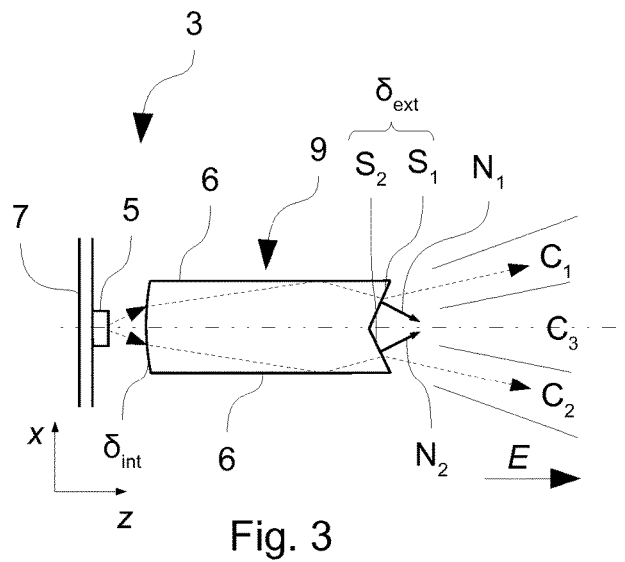
Figure 4:
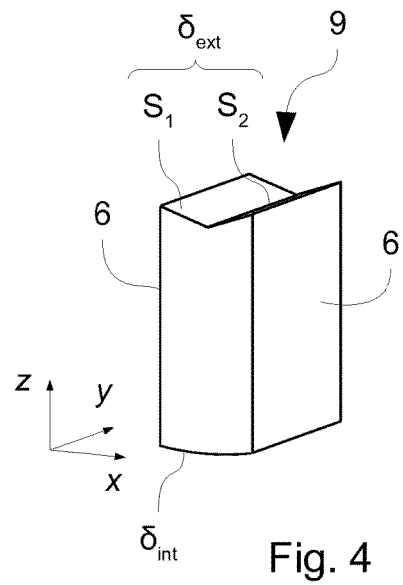
Figure 5:
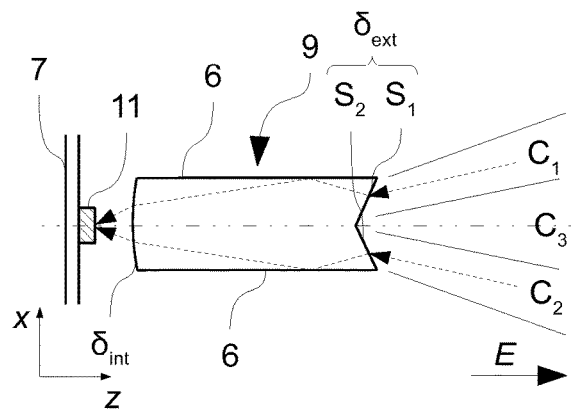
Figure 6:
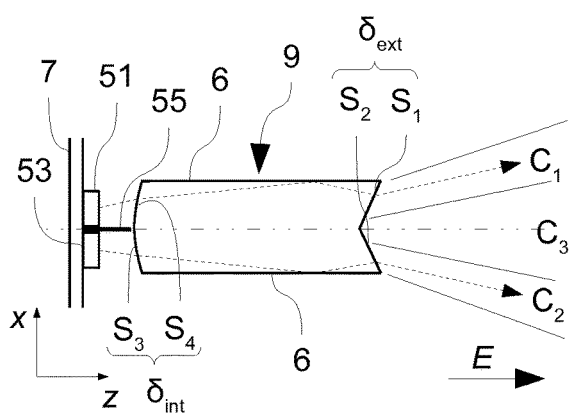
Figure 7:
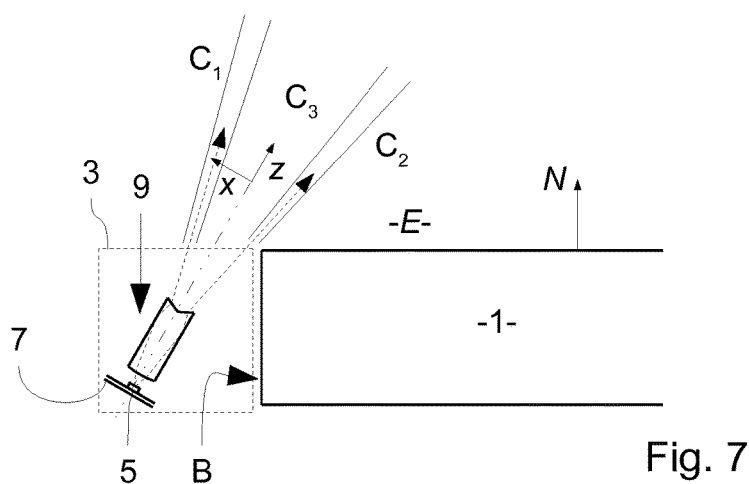
Figure 8A:
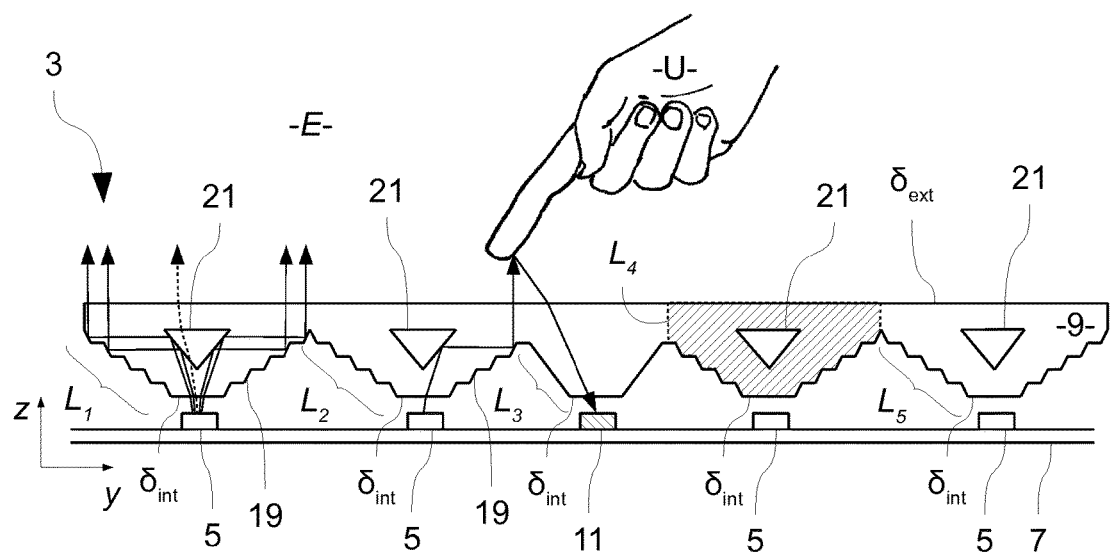
Figure 8B:
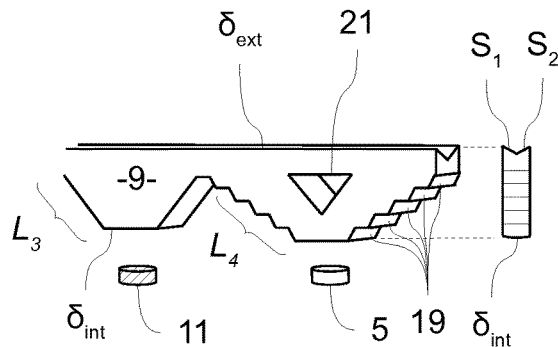
Figure 9:
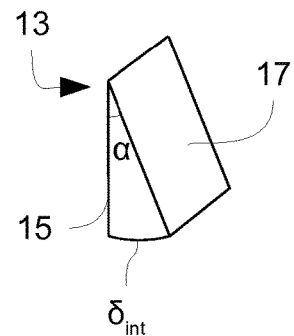
Figure 10A:
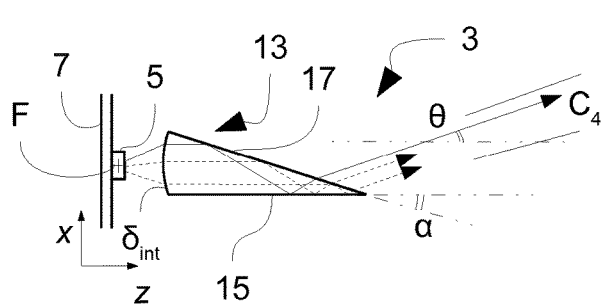
Figure 10B:
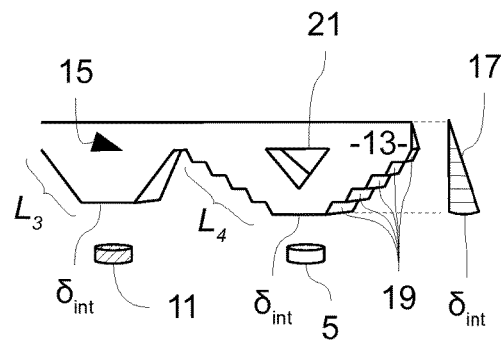
Figure 11:
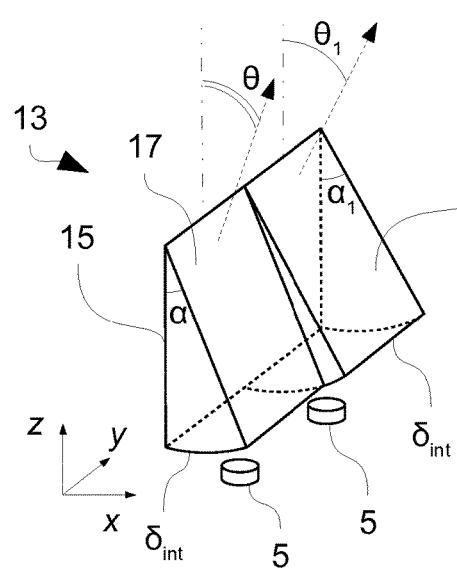
Figure 12A:
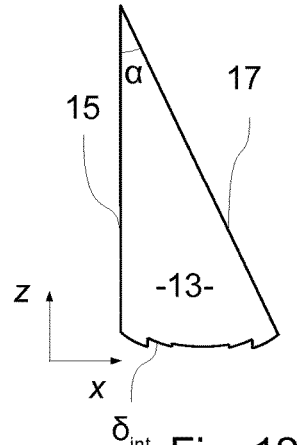
Figure 12B:
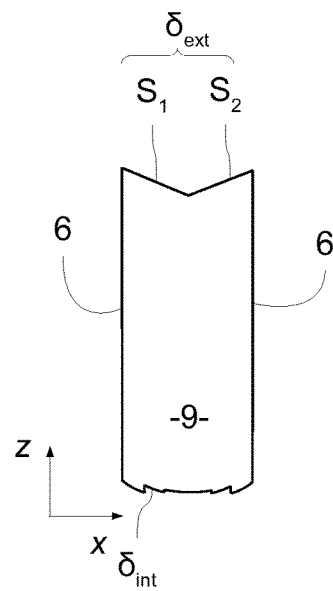
Figure 13:
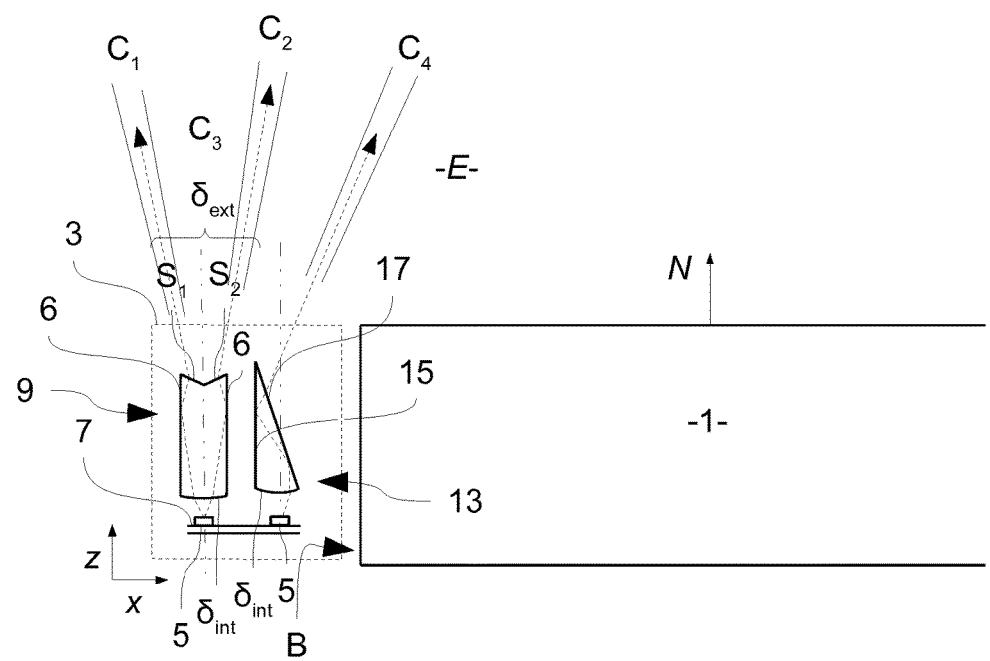

Further features and advantages of the invention will become more clearly apparent upon reading the following description, which is given by way of illustrative and non-limiting example, and the appended drawings, in which:

FIG. 1 schematically shows a vehicle interior with an interface module,

FIG. 2 is a schematic side view of the interface of FIG. 1 on its own,

FIG. 3 is a sectional view of a detection module of the interface of FIGS. 1 and 2, FIG. 4 is a schematic depiction of a light guide according to the invention, FIGS. 5 and 6 are sectional views of modules of alternative embodiments of the detection module, FIG. 7 illustrates the placement of the light guide in the interface, FIGS. 8a and 8b are a longitudinal view and a partial perspective view of one particular embodiment of a light guide, FIG. 9 is a schematic depiction of a second light guide for an interface module, FIG. 10a illustrates the positioning of the light guide of FIG. 9 in a detector, FIG. 10b is a partial perspective view of one particular embodiment of the second light guide, FIG. 11 is a perspective view of an alternative embodiment of the second light guide, FIGS. 12a and 12b illustrate alternative embodiments of the light guide as in FIGS. 3 and 9, FIG. 13 illustrates the positioning of two light guides in one and the same gesture sensor.

In all of the figures, the same references denote the same elements.

The embodiments described with reference to figures are examples. Although the description refers to one or more embodiments, this does not necessarily mean that each reference relates to the same embodiment, or that the features apply only to a single embodiment. Single features of various embodiments may also be combined to create other embodiments.

Terms below such as "first", "second" and the like are given for ease of referencing, without considering priority, preference or particular order. The majority of the objects referenced in this way may have their references swapped without departing from the concept of the invention.

In particular, some elements are referenced in the context of an orientation in the direction of propagation of light, in a particular operating direction. Terms such as "upstream", "downstream", "before", "after", given without further clarification, should be interpreted in this sense.

FIG. 1 schematically shows a motor vehicle passenger compartment 1, with an optical device 100.

The interface module 100 is installed here in the central console of the vehicle: the vertical or inclined front wall, located between the driver and the passenger at the front of the vehicle. This location allows the driver, who is in this case the user U of the interface module 100, to easily bring his hand into the detection space of the interface module 100 in order to interact with the interface module 100.

The interface module is shown in more detail in FIG. 2.

FIG. 2 is a side view of the interface module 100 showing, in more detail, a screen 1 and gesture detectors 3, as well as the hand of a user U, for example the driver or the front passenger of the vehicle. In FIG. 2, the screen 1 and the gesture detectors 3 are located in a vertical plane, and represented by their rectangular cross sections.

The screen 1 is for example a thin-film transistor screen, in particular a light-emitting diode screen, plasma screen or liquid-crystal screen. The screen 1 displays data relating to the operation of functional modules of the vehicle, for example an air-conditioning module, an audio system, a navigation assistant, etc.

The data that are displayed are, for example in the context of an air-conditioning module, a setpoint temperature, a blower power, an outside temperature, etc.

As an alternative, a panel of keys, buttons, light-emitting diodes or a touch surface may replace the screen 1, which may simply be a display screen, or else a touchscreen.

In the case of a touchscreen 1, the detection of the approaching hand may for example be used to bring the touch panel covering the screen 1 out of a standby state or else to animate and/or enlarge icons around an expected pressing position. In the case of a display screen 1, the detection of the approach of the hand of the user U may be used to trigger an increase in backlighting of the screen 1.

Detectors 3 are positioned on the periphery of the screen: a detector 3 is shown below the screen 1, but other detectors 3 may be implemented on the sides and above the screen 1.

The detector or detectors 3 is or are for example presence or proximity sensors, which simply detect the presence of the hand of the user U in the areas C1, C2, which are in this case cones elongated parallel to the edge of the screen closest to the detector 3, thus approaching a plane in a detection space E.

The detectors 3, by way of light sources 5, generate light beams in preferred directions around the areas C1, C2, represented by dotted arrows oriented in the direction of propagation, in the detection space E located in front of the screen 1. When the user U brings his hand into said detection space E, his hand blocks some of the beams from the detectors 3.

The hand of the user U then reflects or scatters part of the light from the beam toward the detector 3, where this reflected or scattered light is received by a photovoltaic detector 11 and interpreted as the detection of the hand of the user U in the detection space E at the intersected beam.

The light source or sources 5 and the photovoltaic detector or detectors 11 are associated with light guides, not shown in FIG. 2 and described in FIGS. 3 to 13.

In order to allow positioning and tracking of movements of the hand of the user U, the detection space is split into grids by beams originating from the detectors 3. The beams C1, C2 may in particular be produced in the form of cones, the apex of which is located at the detector 3, elongated in one direction and thin (a few degrees) in the other direction. The beams C1, C2 are in particular oriented in inclined directions at increasing angles with respect to the normal N to the screen 1 in the direction of the interior of the detection space E, and separated by an area C3 itself also in the form of a conical beam in which the emitted or detected brightness is lower.

By using a set of beams in this form, with some of the beams associated with a first vertical detector 3 and oriented along a length of the screen 1, and other beams associated with a second horizontal detector 3 oriented along the width of the screen 1, it is possible to split the detection space E into grids. By detecting and recording which beams are blocked at which time by the hand of the user U, it is possible to detect the presence and analyze simple movements of the hand of the user U in the detection space E.

The detector 3 may then form part of an approach detector, simply detecting the entry of the hand of the user U into the space E and the approach thereof toward the screen 1 by successively detecting the presence of the hand of the user U in each of the beams C1, C2.

As an alternative, the detector 3 may be used in the context of a gesture interpretation interface, and the user U then performs gestures in the detection space E in order to control one or more functions and units of the vehicle, in particular in combination with the screen 1.

In order to detect and interpret simple gestures such as vertical or horizontal swipes, simple geometric figures (crosses, circles, waves, etc.), a relatively low resolution is required, but a plurality of beams (between three and six typically depending on the size of the screen 1) are however required.

A light emission unit in one embodiment of a detector 3, which interacts with an associated light detection unit, is shown schematically in a sectional view in FIG. 3.

This light emission unit comprises a light source, in this case a light-emitting diode 5, emitting light in a spectral region invisible to the human eye, for example in the infrared region, and a light guide 9.

This light-emitting diode 5 is positioned on a printed circuit board 7, produced in particular in the form of a resin plate on which metal tracks are etched. The printed circuit board 7 in particular provides the supply of electric power for the light-emitting diode 5 by being connected to an electric current source, for example a power adapter drawing electric current from the battery of the vehicle. The light-emitting diode 5 and the printed circuit board 7 are located on a side opposite the detection space E of the detector 3, referred to below as the inner side.

As an alternative, a VCSEL ("vertical cavity surface emitting laser") laser diode may be used, in combination with an optical device such as an overmolded lens, to generate a conical light beam.

The printed circuit board 7 defines a plane xy, the overall direction of light propagation defines a direction z, the directions xyz here forming an orthogonal reference frame. In preferred embodiments, the transverse longitudinal direction y is parallel to the edge of the screen 1 against which the detector 3 should be positioned.

The direction y is parallel to the edge of the screen 1 along which the detector 3 is positioned. Therefore, in some embodiments, the direction y may coincide with a longitudinal axis or direction of the light guide 9. The direction x, orthogonal in the plane of the printed circuit board 7, is denoted the thickness. The direction z will hereinafter be called height, and is for example parallel to an optical axis of the mentioned light guides 9.

The light beam originating from the light-emitting diode 5 is sensed by a light guide 9, made of a material that is translucent or transparent in the spectral region of the light-emitting diode 5, for example polycarbonate, in particular injection-molded polycarbonate. The light guide 9 is shown in perspective in FIG. 4.

The light guide 9 comprises a body elongated in the longitudinal direction y and relatively thin in the direction of the thickness x orthogonal to y. For example, the thickness in the direction x of the body of the light guide 9 is between 5 and 20 mm, whereas the length in the direction y is between 40 mm and the total length of the side of the screen 1, or more generally of the interface element along which the detector 3 is positioned.

The light guide 9 comprises an inner diopter $\delta_{int}$ and an outer diopter $\delta_{ext}$.

The inner diopter $\delta_{int}$ is positioned in front of the printed circuit board 7, opposite the light-emitting diode 5, and the outer diopter $\delta_{ext}$ is positioned on the opposite side in the direction z, in the direction of the detection space E.

The inner diopter $\delta_{int}$ is produced in planar form, in particular parallel to the printed circuit board 7, or else curved in the plane xz or yz, or even in the form of a converging lens, the focal point of which is then located at the height of the printed circuit board 7, in particular at the expected position of the light-emitting diode 5 in the assembled state of the detector 3. The shape of the inner diopter $\delta_{int}$ is then used in particular to form a wavefront of known and controlled shape in order to better shape the conical beams that are obtained.

In the embodiment of FIG. 3, the inner diopter $\delta_{int}$ is an input diopter: the light originating from the light-emitting diode 5 is collected by said inner diopter $\delta_{int}$ and reflected by total reflection from the guide walls 6 in yz.

On the far side in terms of the height z of the printed circuit board 7, bearing the light-emitting diode 5, the outer diopter $\delta_{ext}$ of the light guide 9, which is an output diopter in the embodiment of FIG. 3, is located at the end opposite the inner diopter $\delta_{int}$.

This outer diopter $\delta_{ext}$ comprises two planar transverse surfaces S1, S2 that are distinct and inclined with respect to one another. In particular, their respective normals N1 and N2 are inclined by an angle of between 10° and 120°, in particular of the order of 20° to 90°.

The outer diopter $\delta_{ext}$ has a transverse cross section (in the plane xz) in the shape of a concave V.

The planar surfaces S1, S2 each combine light between two separate portions C1, C2 of the detection space E, on the one hand, and the inner diopter $\delta_{int}$, on the other hand. "Combine" is understood here to mean that, in the direction of light propagation, either the light entering the inner diopter $\delta_{int}$ is emitted in the cones C1, C2 or the light entering the planar surfaces S1, S2 with rays contained in the cones C1, C2 is emitted by the inner diopter $\delta_{int}$.

In the embodiment of FIG. 3, the inner diopter $\delta_{int}$ is an input diopter, and the outer diopter $\delta_{ext}$ is an output diopter.

The light leaving via the surface S1 of said outer diopter $\delta_{ext}$ is therefore emitted in a cone C1 elongated in the transverse direction y, and open only slightly in the plane xz of FIG. 3. The emitted beam is therefore centered about an inclined transverse plane. The incline of said plane depends on the direction of the normal N1 of the surface S1 and on the index of the transparent material of the light guide 9.

Likewise, the light leaving via the surface S2 is emitted in a transversely elongated cone C2 that is separated from the first emission cone C1 by a third elongated cone C3 in which little or even no light is emitted.

The incline of the second elongated cone C2 with respect to the axis z of propagation is again controlled by the normal N2 of the surface S2 and the index of the transparent material of the light guide 9.

The detector 3 then furthermore comprises a light detector (for example the light detection unit shown in FIG. 5 and which will be described later on) which senses light originating from a large portion or even all of the detection space E located for example on the printed circuit board 7 and offset from the light-emitting diode 5 in the direction x and/or y.

As an alternative, the light detector may be moved to another printed circuit board 7, and form a module relatively separate from the module generating the beams C1, C2.

FIG. 3 contains the trace of two light rays originating from the light-emitting diode 5, represented by dotted lines oriented in the direction of propagation. The rays are emitted by the light-emitting diode 5, one inclined upward in FIG. 3, the other downward.

The light rays enter the light guide 9 through the inner diopter $\delta_{int}$, where they are refracted for a first time.

The upwardly inclined light ray is reflected by the upper guide wall 6 of the light guide 9 by total reflection, and then leaves the light guide 9 via the outer diopter $\delta_{ext}$, where it is refracted for a second time at the surface S1 and emitted in the associated elongated cone C1.

The downwardly inclined light ray is reflected by the lower guide wall 6 of the light guide 9 by total reflection, and then leaves the light guide 9 via the outer diopter $\delta_{ext}$, where it is refracted for a second time at the surface S2 and emitted in the associated elongated cone C2.

When the hand of the user U passes through one of the elongated cones C1, C2, the light detector senses the light emitted by the light-emitting diode 5 in said elongated cones C1, C2, and this sensed light is used to approximately determine a position of the hand of the user U.

By approximately tracking the position of the hand of the user U over time from a recorded sequence of the elongated cones C1, C2 intersected over time, gestures by the user U are able to be determined and interpreted in order to allow him to interact with the interface module 100.

In order to distinguish which of the cones C1, C2 is intersected by the user U, tracking of the detected variations in brightness over time may be used: one of the cones C1, C2 is generally more inclined with respect to the surface of the screen 1 (C1 in FIGS. 7 and 13), or closer to the normal N of said screen 1. This more inclined cone C1 is as it were systematically intersected first when the user U brings his hand closer in the direction perpendicular to the screen 1 or else from a position beyond the lateral edges of the screen 1.

FIG. 5 illustrates a light detection unit of one embodiment of a detector 3. This is a "counterpart" of FIG. 3. Specifically, in FIG. 5, the inner diopter $\delta_{int}$ is an output diopter, and the outer diopter $\delta_{ext}$ is an input diopter.

In front of the inner diopter $\delta_{int}$, in this alternative embodiment, there is a light detector 11 (instead of the light-emitting diode 5), for example a photovoltaic diode, with a possible optical light guide device comprising for example an overmolded lens, and/or tubular walls for selecting a specific detection cone in order to avoid sensing stray photons.

The inner diopter $\delta_{int}$ is then an output diopter located, in the mounted state of the light guide 9, facing the light detector 11. The outer diopter $\delta_{ext}$, by virtue of its two surfaces S1 and S2, then senses the light reflected by the hand of the user U in the two cones C1, C2 elongated transversely about the two inclined planes in the detection space E, and sends the light from each of the two inclined planes toward its inner diopter $\delta_{int}$, where it is sensed by the light detector 11.

The path of two light rays is shown in FIG. 5, one entering at the outer diopter $\delta_{ext}$ via the upper elongated cone C1 in FIG. 5, the other via the lower elongated cone C2 in FIG. 5.

The two light rays are guided by total reflection from the guide walls 6 (in yz) of the light guide 9 to the inner diopter $\delta_{int}$, where they are refracted and then sensed by the light detector 11.

It is thus understood that, in this embodiment of FIG. 5, simply by reversing the position of the diodes 5 and of the detectors 11, a gesture sensor 3 is obtained that works with rays that follow similar paths, but simply in the opposite direction: they are sensed where they are initially emitted in the embodiment of FIG. 3, and emitted where they are initially sensed in the embodiment of FIG. 3.

As an alternative or in addition, the gesture sensor 3 may respectively comprise a plurality of detectors 11 in the case of FIG. 3, or a plurality of diodes 5 in the case of FIG. 5. These detectors 11 or diodes 5 then sense or emit light specifically in a portion of the detection space E containing only one of the cones C1, C2. By determining the detector 11 or the diode 5 to which the sensed or emitted light corresponds, it is then possible to ascertain which cone C1, C2 is intersected.

The detector 3 then comprises at least one light source, comprising in particular one or more light-emitting diodes 5, which emits light into the entire detection space E. The light-emitting diodes 5 of the light source may in particular be positioned on the same printed circuit board 7 as the light detectors 11, or else form a relatively separate module, with its own printed circuit board 7.

FIG. 6 is a sectional depiction (xz) of one alternative embodiment of a detector 3 derived from the embodiment of FIG. 3, allowing better logical distinction of the intersected cone C1 or C2.

In this embodiment, the inner diopter $\delta_{int}$ has two surfaces S3, S4 forming converging lenses, each combined with one of the surfaces S1, S2 of the outer diopter text. In the embodiment of FIG. 6, the inner diopter $\delta_{int}$ is located in front of two light-emitting diodes 51, 53, between which there is positioned a splitter plate 55 that is opaque in the spectral region that is used.

The light originating from the first diode 51 is guided by internal reflection to the surface S1 and emitted primarily in the associated elongated cone C1. Likewise, the light originating from the second diode 53 is guided by internal reflection to the surface S2 and emitted primarily in the associated elongated cone C2.

By turning on each of the diodes 51, 53 in rapid alternation (frequency greater than several tens of Hertz) and by determining the time window in which the sensed light was emitted, it is then possible to rapidly determine which light cone C1 or C2 is intersected by the hand of the user U in the detection space E using a single light detector.

Another embodiment (not shown) is obtained in a similar manner based on the embodiment of FIG. 5. The inner diopter $\delta_{int}$ then comprises two surfaces forming converging lenses, each combined with one of the surfaces S1, S2 of the outer diopter $\delta_{ext}$, and in front of said inner diopter $\delta_{int}$ there are then two light detectors 11 separated by a splitter plate 55 that is opaque to the spectral region that is used.

The light entering via each of the cones C1 and C2 is then guided primarily toward one or the other of the light detectors 11 in a direction of propagation opposite that of FIG. 6.

FIG. 7 illustrates the positioning of the elements of the previous figures with respect to the screen 1 in the context of a detector 3 arranged along an edge B of said screen 1.

The light guide 9 is positioned with its optical axis z inclined with respect to the vertical normal N of the screen 1, which is shown horizontal here. The printed circuit board 7 bearing the light-emitting diode 5, which is orthogonal to said optical axis z, is in this case itself also inclined with respect to the horizontal plane of FIG. 7. The angle of incline is for example an angle between 0° and 45°. The angle 0°, corresponding to the case where xy is coplanar with the screen 1, is preferable if possible, since a single printed circuit board 7 is then able to connect the elements of the sensor 3 and of the screen 1 at the same time (see FIG. 13).

The detector 3 may then be covered with a cover transparent to the spectral region that is used (infrared), and opaque in the region visible to the human eye. It is thus possible to make the gesture sensor or sensors 3 invisible to the user U. The cover may either be a rigid frame possibly forming an aid for holding and fastening the screen 1, or else be printed on a film or a protective plate that covers the screen 1 and extends beyond the edges of said screen 1 so as to cover the gesture sensor or sensors 3 positioned along the edges of the screen 1 at the same time as said screen 1.

FIG. 8a is a view in the plane yz of a light guide 9 with the printed circuit board 9 at the bottom, according to one particular embodiment suitable for large screens 1. FIG. 8b is a perspective view of a longitudinal portion (in y) of the light guide 9 of FIG. 8a, with the cross section in the corresponding transverse vertical plane xz.

In this embodiment, the light guide 9 comprises a plurality of inner diopters $\delta_{int}$ each located in front of a light-emitting diode 5 or a light detector 11, along the transverse axis y.

The embodiment of FIG. 8 comprises in particular four light-emitting diodes 5 and a light detector 11, with two light-emitting diodes 5 positioned on each side of the light detector 11 on the printed circuit board 7 along a transverse line on the printed circuit board 7.

The inner diopters $\delta_{int}$ are separated by inclined walls 19, flared in the direction of the detection space E. The inclined walls 19 thus define lobes numbered L1 to L5, starting from the left in FIG. 8. The central lobe L3 is the one in front of the light detector 11. The lobes L1 to L5 are in the shape of a truncated pyramid, the inner diopter $\delta_{int}$ of which is situated at the truncated tip, located toward the interior of the interface module 100.

The lobe L4 is shown in hatched form in FIG. 8a, and FIG. 8b shows only two lobes L1, L3 considered separately.

The light guide 9 is in particular produced in one piece: the lobes L1 to L5 are joined by their upper portion by meeting at their flared side in the direction of the outer diopter $\delta_{ext}$. Other embodiments may be obtained by producing each of the lobes L1 to L5 separately, and by positioning them in a manner aligned parallel to the edge of the screen 1 in the transverse direction y.

The lobes L1, L2, L4 and L5 (those located in front of a light-emitting diode 5) have flared side walls 19 produced in the form of steps, alternating between faces in the plane xy of the printed circuit board 7 and inclined faces forming the flaring.

The lobe L3 facing the light detector 11 has straight flared side walls 19 and a trapezoidal cross section.

The lobes L1, L3 in FIG. 8b, for one of them, L1, have walls in the form of steps, and for the other, L3, have a trapezoidal cross section.

The lobes L1, L2, L4 and L5 comprise, at their center, prismatic cavities 21 in the transverse direction x perpendicular to the axis along which said lobes are aligned. The prismatic cavities 21 of the lobes L1, L2, L4 and L5 have a cross section in the plane yz of FIG. 8 in the shape of a triangle, in particular an isosceles triangle, the base of which is oriented toward the detection space E, and the apex of which is oriented toward the light-emitting diode 5.

These prismatic cavities 21 make it possible to deflect, by total reflection, some of the light rays emitted by the diode 5 toward the inclined walls 19 with a significant transverse incline (transverse edges of the beam). At said inclined walls 19, these light rays are again deflected by total reflection in the direction of the outer diopter text, where they are emitted in the direction of the detection space E in the cones C1 and C2 (not shown in FIG. 8a).

A few light rays following such a path are shown in unbroken lines at the lobe L1 on the left in FIG. 8a.

The relatively central and axial light rays of the beam emitted by the light-emitting diode 5 under consideration are simply refracted at the prismatic cavity 21, and form a relatively only slightly deflected central portion of the light beams emitted by each of the lobes L1, L2, L4 and L5.

A ray following such a path is shown in dotted lines at the lobe L1 on the left in FIG. 8a.

The lobes L1, L2, L4 and L5 with their prismatic cavities 21 thus make it possible to distribute the light from the light-emitting diodes 5 relatively uniformly along the transverse direction y parallel to the edge of the screen 1 in the cones C1 and C2.

As an alternative or in addition, the detector 3 may comprise one or more second light guides 13, as shown in FIG. 9.

The second light guide 13 is shown in FIG. 9 in a perspective view, in the manner of the first light guide 9 in FIG. 4.

The same second light guide 13 is shown in a view in the lateral plane xz in FIG. 10a, in the context of a detector 3. FIG. 10a is similar to FIG. 3 or 5.

The second light guide 13 comprises an inner diopter $\delta_{int}$ located, in the mounted state, facing the printed circuit board 7 bearing a light source 5, in this case a light-emitting diode, or else a light detector 11. The inner diopter $\delta_{int}$ forms a converging lens whose focal point F is located at an expected position of the light-emitting diode 5 or of the light detector 11.

The second light guide 13 is of generally prismatic shape, with a first planar face 15 parallel to the axis z, substantially contained in the plane yz, and a second planar face 17 inclined with respect to the first planar face 15 by an angle α.

The second light guide 13 may in particular be obtained by molding a plastic material such as polycarbonate, in particular by injection molding.

In the embodiment of FIG. 10a, the inner diopter $\delta_{int}$ is an input diopter: the inner diopter $\delta_{int}$ faces a light-emitting diode 5 and the light beam emitted by said light-emitting diode 5 enters the second light guide 13 via the inner diopter $\delta_{int}$.

The light beam emitted by the light-emitting diode 5, which is located at the focal point F, is collimated by the inner diopter $\delta_{int}$. The parallel and axial rays (axis z) in the second light guide 13 are reflected for a first time by total reflection from the second planar face 17, and then for a second time by total reflection from the first planar face 15.

The light rays then encounter the second planar face 17 for a second time, but they then have an angle of incidence high enough not to be totally reflected, and then exit via said second planar face 17 at an angle θ with respect to the axis z.

The second planar face 17 thus forms both a reflective wall and an output diopter $\delta_{ext}$ of the second light guide 13.

The second light guide 13 thus emits a beam in a cone C4 elongated in the transverse direction y, centered about a plane inclined with the direction z by an angle θ, with a relatively small angular aperture.

The angle α and the angle θ are linked by the relationship:

$$\cos(\alpha+\theta)=(1+\varepsilon)n_{GL}*\cos 3\alpha,$$

in which:
c is a number between −0.1 and 0.1;
and $n_{GL}$ is the index of the transparent material forming the second light guide 13.

The number ε in this case accounts for the uncertainties in terms of the dimensioning and manufacture of the second light guide 13 and in terms of the positioning of the diodes 5 and/or sensors 11, and may be smaller if sufficient accuracy allows for this. The number c may then for example be between −0.01 and 0.01 (1% error) with more precise machining and assembly.

In particular, rigorous equality (to within machining tolerances) may be achieved, and the angle α and the angle θ are then substantially linked by the relationship:

$$\cos(\alpha+\theta)=n_{GL}*\cos 3\alpha.$$

This scenario corresponds to ε=0 or more realistically to a negligible error rate.

According to another embodiment according to which a photovoltaic detector 11 is positioned in the place of the light-emitting diode 5, the inner diopter $\delta_{int}$ is an output diopter. The printed circuit board 7 then bears a light detector 11, located in front of the inner diopter $\delta_{int}$, and which collects light entering the second light guide 13 via the cone C4 via the second planar face 17, and which leaves said second light guide 13 via the inner diopter $\delta_{int}$ by being focused at the focal point F where the light detector 11 is located.

The second light guide 13 makes it possible to achieve large angles of emission θ, in particular greater than 25°, and in particular between 30° and 45° using polycarbonate of conventional index $n_{GL}$, that is to say between 1.4 and 1.6.

When the inner diopter $\delta_{int}$ is an input diopter, the detector 3 furthermore comprises at least one light detector 11, which senses the light reflected by the hand of the user U in the whole detection space E, the approximate determination of the position of the hand of the user U being performed by determining the intersected beams from which the detected light originates.

When the inner diopter $\delta_{int}$ is an output diopter, the detector 3 furthermore comprises at least one light source 5, which emits light into the entire detection space, reflected by the hand of the user U and sensed when it is reflected at the detector 3 in the beams C1, C2 or C4, the approximate determination of the position of the hand of the user U being performed by determining the beams C1, C2 or C4 in which the detected light is incident.

With reference to FIG. 10b, the longitudinal shape in the plane yz of the second light guide 13 may be identical to that of the light guide 9 shown in FIG. 8a. FIG. 10b is a perspective view of a longitudinal portion (in y) of a second light guide 13 with the longitudinal shape of FIG. 8a, with the cross section in the general shape of a prism in the corresponding transverse vertical plane xz.

The second light guide 13 then itself also comprises a plurality of lobes L1, L2, L3, L4 and L5 (only the lobes L3 and L4 are shown in FIG. 10b) in the direction y, each with an inner diopter $\delta_{int}$ located opposite a light-emitting diode 5 or a light detector 11.

A subset L1, L2, L4 and L5 of the lobes may then have flared side walls 19 produced in the form of steps, and at least one L3 of the lobes may have a trapezoidal cross section.

Some of the lobes L1 to L5 may also comprise prismatic cavities 21, as described in the case of FIGS. 8a and 8b.

Light is then emitted in the cone C4 with a relatively uniform intensity in the direction y parallel to the edge of the screen 1 in which said cone C4 is elongated.

FIG. 11 illustrates one particular embodiment in which the second light guide 13 comprises a plurality of cross sections along the axis y, each with an inner diopter $\delta_{int}$. The first planar faces 15 of these cross sections are located in one and the same plane, and the second faces 17 inclined with respect to the first planar faces form two differing angles α and α1 therewith. This results in a "step" in the plane xz at the interface between the two transverse portions.

The second light guide 13 is then placed opposite two light-emitting diodes 5 (FIG. 11) or else facing two light detectors 11 (not shown) aligned in the transverse direction y.

The light guide 13 thus obtained therefore emits two beams inclined at angles θ and $\theta_1$, linked to the two angles α and $\alpha_1$ by the relationships:

$$\cos(\alpha+\theta)=(1+\varepsilon)n_{GL}*\cos 3\alpha$$

and $$\cos(\alpha_1+\theta_1)=(1+\varepsilon)n_{GL}*\cos 3\alpha_1.$$

Other embodiments may be achieved with more than two cross sections, each having an incline α, $\alpha_1$, $\alpha_2$, ..., $\alpha_n$ that is potentially different, and the same number of light-emitting diodes 5 and/or light detectors 11.

The second light guide 13 then emits or collects using transverse beam portions with different angles of incline θ, $\theta_1$, $\theta_2$, ..., $\theta_n$.

In particular, the cross sections with different inclines may correspond to lobes L1 to L5 starting from a light guide with a longitudinal shape in the plane yz, as in FIG. 10b.

The cross sections then each have an inner diopter $\delta_{int}$ respectively in front of one of the light-emitting diodes 5 or of a light detector 11, which may be turned on in different time windows in order to make it possible to identify which transverse beam portion is intersected by the user U.

FIGS. 12a and 12b are sectional views along the plane xz of alternative embodiments of the first and second light guide 9 and 13, respectively, in which the inner diopter $\delta_{int}$ is produced in the form of a Fresnel lens, and the light source 5 or the light detector 11 in front of the inner diopter is located at the focal point of the Fresnel lens.

Their inner diopter $\delta_{int}$ then has nested concentric rings, the outer surface of which conforms in segments to a convex lens.

It is thus possible to make the light guides 9, 13 more compact in the direction z.

The second light guide 13 may itself also have a cross section in the plane yz as shown in FIG. 8, with a plurality of inner diopters $\delta_{int}$ aligned along a transverse axis y of the light guide, each intended to be positioned at a light source 5 or a light detector 11, separated by walls defining lobes L1 to L5 with prismatic cavities 21.

FIG. 13 is a partial sectional view in the transverse plane xz of the interface module 100 comprising the screen 1 and the detector 3.

FIG. 13 is similar to FIG. 7, but in FIG. 13 the detector 3 comprises a first light guide 9 as shown in FIGS. 3 to 8 and 12b, and a second light guide 13 as shown in FIGS. 9 to 11 and 12a.

The first and the second light guide 9, 13 are positioned on one and the same printed circuit board 7, with their transverse axes y parallel to one another and to the edge of the screen 1, the axis z orthogonal to the printed circuit board 7 is inclined with respect to the normal N to the screen 1, for example by an angle of between 10° and 45°.

The beams C1, C2 and C4 from the light guides 9 and 13 are then positioned in the detection space E with increasing angles with respect to the normal N to the screen 1.

The first beam emitted by the first light guide 9 in the cone C1 is almost vertical, forming a first detection plane. The second beam in the cone C2 of the first light guide 9 is more inclined than the first beam in the cone C1, and forms a second detection plane. The third beam emitted in the cone C4 is even more inclined with respect to the normal N to the screen 1.

The interface module 100 is in particular provided with at least one second detector 3, in particular identical to the first one, located along a perpendicular edge of the screen 1.

With two perpendicular gesture sensors 3 each with three detection planes, the detection space E is divided into nine ($3^2$) plots in the plane of the screen 1, thereby making it possible in particular to interpret simple gestures such as swipes, circles or crosses.

The combined use of the two light guides 9, 13 makes it possible to place the light generation and detection electronics (sources 5 and detectors 11, power adaptation and distribution, etc.) on a single printed circuit board 7, instead of using three gesture sensors 3 oriented in different directions so as to form each of the three detection planes, which assumes that each one has its own printed circuit board 7, oriented depending on the direction of the detector 3 to which it belongs.

The detector 3 that is thus obtained, and the interface module 100 that incorporates it, is then potentially more compact, lighter, and easier to assemble. As a result, the interface module 100 may be integrated into less spacious vehicle passenger compartments, or else in the presence of other adjacent interface elements.

The invention claimed is:

1. A light guide for an interface module, for a vehicle passenger compartment, for emitting or receiving a light beam in a cone elongated in a transverse direction and centered about a plane inclined by an angle $\theta$ with respect to an optical axis of the light guide, produced in the form of a prism of transparent material of index $n_{GL}$, the light guide comprising:

an inner diopter configured to face a printed circuit board bearing a light source or a light detector, forming a converging lens whose focal point is located at an expected position of the source or of the light detector;

a first planar face oriented parallel to the optical axis of the light guide; and a second planar face inclined with respect to the first planar face by an angle $\alpha$, satisfying $\cos(\alpha+\theta)=(1+\varepsilon) n_{GL}*\cos 3\alpha$, where $\varepsilon$ is a number between −0.1 and 0.1.

2. The light guide as claimed in claim 1, wherein the inner diopter is an input diopter located, in the mounted state of the light guide, in front of a light source.

3. The light guide as claimed in claim 1, wherein the inner diopter is an output diopter located, in the mounted state of the light guide, in front of a light detector.

4. The light guide as claimed in claim 1, wherein the inner diopter is produced in the form of a Fresnel lens, and the light source or the light detector in front of the inner diopter is located at the focal point of the Fresnel lens.

5. The light guide as claimed in claim 1, wherein the angle $\theta$ is between 30° and 45°.

6. The light guide as claimed in claim 1, further comprising: a plurality of inner diopters aligned along a longitudinal axis of the light guide, each intended to be positioned at a light source or a light detector.

7. The light guide as claimed in claim 6, further comprising: at least one transverse portion, the second planar face of which forms an angle $\alpha_1$ different from the angle $\alpha$ with the first planar face, so as to emit transverse beam portions at an angle $\theta_1$ linked to the angle $\alpha_1$ by the relationship $\cos(\alpha_1+\theta_1)=(1+\varepsilon) n_{GL}*\cos 3\alpha_1$, where $\varepsilon$ is a number between −0.1 and 0.1.

8. An interface module for a vehicle passenger compartment, for detecting the presence of or gestures by part of the body of a user, comprising:

at least one light source configured to illuminate at least part of a detection space of the interface module;

at least one light detector configured to detect light from the source returned by part of the body of the user located in the detection space; and a light guide as claimed in claim 1, configured so as to emit or collect light in a beam centered about a plane inclined with respect to the optical axis by an angle $\theta$ between 30° and 45°.

9. The interface module as claimed in claim 8, further comprising:

respectively, at least two light sources or at least two light detectors, arranged on a printed circuit board, respectively, at least one detector or at least one light source, covering the entire detection space;

the first light guide, positioned in front of at least one of the light sources or one of the light detectors on the printed circuit board, a second light guide comprising a body made of transparent or translucent material guiding light by reflection from its side walls, comprising:

an inner diopter of the second light guide at one of the ends of the transparent or translucent body, intended to be directed to a light detector or one or more light sources, an outer diopter, located at an end opposite the inner diopter of the body made of transparent material, wherein the outer diopter of the second light guide comprises two distinct transverse surfaces, with normals pointing in different directions in order to combine light between two separate portions of the detection space and the inner diopter of the second light guide.

10. The interface module as claimed in claim 9, wherein the two separate portions of the detection space are two transversely elongated cones, located about two planes that are inclined with respect to a height of the first light guide by angles less than the angle $\theta$.

11. The interface module as claimed in claim 9, wherein the sources and/or the light detectors associated with the first and the second light guide are positioned on one and the same printed circuit board.

\* \* \* \* \*